United States Patent [19]

Baudoin

[11] 4,035,592
[45] July 12, 1977

[54] SUBSCRIBER MONITORING UNIT FOR ELECTRONIC TELEPHONE EXCHANGES

[75] Inventor: Michel Baudoin, Saint-Prix, France

[73] Assignee: Societe Francaise des Telephones Ericsson, Colombes, France

[21] Appl. No.: 709,091

[22] Filed: July 27, 1976

Related U.S. Application Data

[63] Continuation-in-part of Ser. No. 511,377, Oct. 2, 1974, abandoned, which is a continuation-in-part of Ser. No. 431,655, Jan. 8, 1974, abandoned, which is a continuation of Ser. No. 206,275, Dec. 9, 1971, abandoned.

[30] Foreign Application Priority Data

Dec. 10, 1970 France .................. 70.44603

[51] Int. Cl.$^2$ .................................. H04M 3/22
[52] U.S. Cl. ................... 179/175.2 C; 179/18 F
[58] Field of Search ........... 179/175.2 C, 175.2 R, 179/18 F, 18 FA, 18 FF, 18 FG

[56] References Cited

U.S. PATENT DOCUMENTS

| | | | |
|---|---|---|---|
| 3,136,863 | 6/1964 | Melvin | 179/18 FA |
| 3,524,933 | 8/1970 | Risky | 179/18 FG |
| 3,560,655 | 2/1971 | Lucas | 179/18 FF |
| 3,562,436 | 2/1971 | Lutgenau | 179/18 FF |
| 3,673,340 | 6/1972 | Casella et al. | 179/18 J |
| 3,697,701 | 10/1972 | Greason et al. | 179/18 FA |
| 3,740,485 | 6/1973 | Nickerson | 179/18 FA |
| 3,770,899 | 11/1973 | Kobus et al. | 179/18 FG |
| 3,920,934 | 11/1975 | Moorehead | 179/175.2 R |

FOREIGN PATENT DOCUMENTS 1,254,705  3/1965  Germany ............. 179/18 FA

Primary Examiner—Douglas W. Olms
Attorney, Agent, or Firm—Karl W. Flocks

[57] ABSTRACT

The monitoring peripheral equipment is intended to inform the exchange's central unit about the state and nature of the subscriber's receiver and it comprises: a circuit sensing the positions of the relays of the line equipment, a memory unit, an internal logic with a scanner thereof, a liaison circuit logic and a line equipment monitoring device, whereby the lifting of a subscriber's receiver is detected, the information is sent to the internal logic as regards the location, state and processing to be performed, said central unit calls back said liaison circuit logic and the internal logic sets the subscriber's telephone in the connected position.

4 Claims, 3 Drawing Figures

SUBSCRIBER MONITORING UNIT FOR ELECTRONIC TELEPHONE EXCHANGES

This application is a continuation-in-part application of Ser. No. 511,377 filed on Oct. 2, 1974 now abandoned which is a continuation-in-part of Ser. No. 431,655 filed on Jan. 8, 1974 now abandoned which is a continuation of Ser. No. 206,275 filed on Dec. 9, 1971, now abandoned.

The present invention relates to a subscriber monitoring peripheral equipment for an electronic telephone exchange, intended more particularly for integration into an electronic exchange of the recorded or wired program type and for operation in conjunction with one or two computing units of said exchange, in association with a subscriber's bay whose line equipment it monitors.

The function of such a peripheral equipment is to inform the exchange's central unit about the state and nature of the subscriber's receiver or set. It indicates when certain subscribers have lifted their receivers, and possibly also when the latter have been replaced.

In most existing exchanges, the data concerning a subscriber's set are not always concentrated at the same place. Thus, to obtain an equipment number when the directory number is known, it is necessary to interrogate a subsidiary translating unit which it is not simple to devise.

Further, subscriber monitoring devices are designed as a function of the required scale of operation, making extensions thereto difficult.

The present invention accordingly relates to a subscriber monitoring peripheral equipment which concentrates the maximum amount of information about a subscriber's set when a connection is being established.

Operation is independent of the anticipated scale of operation and its structure is so devised as to allow of adding a plurality of such devices in parrallel in order to increase the capacity of an installation.

A monitoring peripheral equipment according to this invention is essentially characterized by the fact that is includes in combination:

a subscriber's line equipment monitoring circuit connected to a subscriber's bay;

a memory-unit of any known type, e.g. of the ferrite cores or semiconductor types, comprising areas in equal number to the subscriber's sets to be monitored by the monitoring peripheral equipment, said memory unit being connected to the central computing-unit;

an internal logic unit connected to said memory unit and to said monitoring circuit;

a memory scanner likewise connected to said monitoring circuit;

a liaison circuit logic connected to the central computing unit;

a maintenance calling circuit connected to said internal logic unit; and a supervision adapting circuit connected to said memory unit.

In accordance with certain further particularities:

the subscriber's line equipment monitoring circuit is a unit which senses the positions of the relays in said equipments;

each area of the memory unit is ascribed to a subscriber's receiver, or set, the line equipment of which is monitored by the subscriber monitoring peripheral equipment;

the memory unit is connected to a so-called 'main register', adapted to cyclically collect the information related to each memory area with a view to contingently transmitting said information to the other circuits of the subscriber monitoring peripheral equipment, in which are recorded, under the control of the internal logic, the data intended to feed the memory-unit prior to their transfer into the latter;

the subscriber monitoring peripheral equipment comprises a liaison circuit register in which are collected the elements of each message to be transmitted to the central unit by order of the internal logic, said register being adapted to receive the orders coming from the central unit;

an exchange may comprise a plurality of monitoring peripheral equipments of the kind hereinbefore described, parallel-connected to a central computing unit, one of said equipments being possibly set aside as an emergency unit and the peripheral equipments as a whole having a common line which may be switched to the desired subscriber's bays.

Further particularities and advantages of the present invention will be more clearly understood from the description which follows with reference to the accompanying non limitative exemplary drawings in which.

Figure 1:
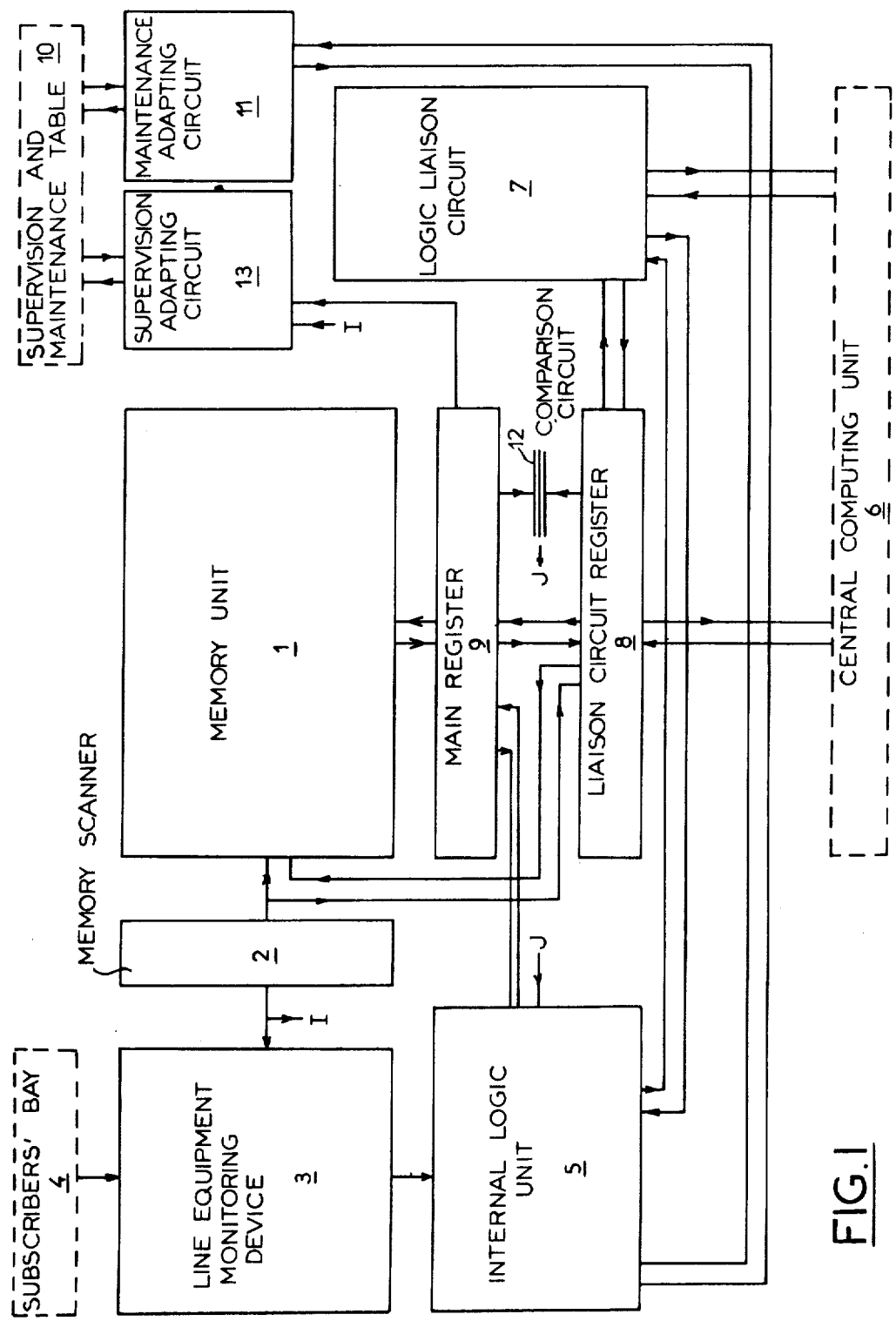
FIG. 1 is a block of a peripheral equipment according to this invention.

Referring first to FIG. 1, the memory 1 is continuously read by a scanner 2. The same scanner furthermore switches the line equipment monitoring device 3 to the subscriber's set whose memory area is being read, whereby a specific scanner position determines the geographical location of a subscriber's line equipment in the subscriber's bay 4.

Each area of memory unit 1 contains every information related to the corresponding subscriber's receiver (or set), such information being of three different types, viz. permanent information, semi-permanent information and transitory information.

The permanent information consists of the directory number and the category of the subscriber's receiver. The category permits to know which operations, among all the operations afforded by the auto-switch, can be carried out from the subscriber's receiver (e.g. no outer phone-calls allowed, or urban and long-distance calls allowed but no international calls allowed, etc.).

The semi-permanent information, hereunder called 'special indications', indicate for instance that the subscriber's receiver or set is intercepted by another set or is waiting for an automatic call-back, etc. This information is recorded in a special indication register included in each memory-area.

The transitory information comprises the position and the degree of occupancy of the subscriber's set as well as a so-called 'reserved' information, the function of which will be explained later on more fully. The subscriber's position is recorded in a position register included in each memory-area; the position permanently indicates the state of the subscriber's line equipment (e.g. indicates that the receiver has been replaced, or that it has been lifted).

The degree of occupancy of the subscriber's receiver is recorded in a degree-of-occupancy register in each memory-area. The degree of occupancy indicates, for instance, that the receiver, or set, is inoperative, or ringing, or that the subscriber is having a local conversation or a long-distance conversation, etc.

The memory unit 1 is a random access memory of any known type whatever, for example with ferrite coils addressed by the memory scanner 2.

It is divided into as many areas as there are subscriber's sets. In the example according to the invention, the information entered in the memory area for a subscriber's set:

the indication reserved (1 bit);

the subscriber's (1 register of 4 bits). This information is defined by the internal logic unit 5 and brought up to date at each cycle of the scanner 2. The computing unit may modify this information;

special indications (1 register of 3 bits). This may be "no special indications, waiting while engaged, subscriber's set sent back, absent, third party entry in course";

the degree of engagement (1 register of 2 bits) specifies whether the number is "at rest", "ringing", on "local or outside conversation". The information contained in these two registers is only modified by the computing unit.

1 bit of non-parity check carrying the two preceding registers;

the category (1 register of 6 bits);

1 bit of non-parity check on the category;

the directory number (1 register of 12 bits);

1 bit of non-parity check on the directory number;

2 time-delay registers, the function of which is explained with respect to the description of the internal logic 5.

The addressing of the memory unit 1 will be explained in connection with the description of the scanner 2.

The memory reading and writing are carried out through the main register 9. They are controlled by impulses from the clock associated with the scanner 2.

The reading of an area causes its entry in the main register 9. The internal logic unit 5 carries out the check as a function of the non-parity bits read with each area.

The scanner 2 is a counter, the position of which correspond to the memory area and at the same time to the geographical situation of the subscriber's set. It is associated with a clock which delivers the syschronizing impulses, obtained for example by means of a multivibrator.

On the memory side, the scanner 2 advances by one memory-area at each impulse delivered by the clock. The directory number register is only explored upon request from the computing unit or from the table 10 which may intervene on the scanner 2 and ask for a "change of advance".

On the subscriber's set bay 4 side, the scanner 2 causes the advance of the monitoring of the two line equipment relays from one subscriber's set to the next following.

For this purpose, the memory address defined by the position of the scanner 2 is decoded in order to address the monitoring of a pair of relays in one bay 4, in the form of information comprising three sets of data (bay, shelf and board numbers) at the same time as the voltage controls necessary for the monitoring are validated.

The memory area corresponding to the subscriber can be brought up to date.

The scanner 2 is provided so as to address the memory unit 1, cyclically, but it may also intervene following a demand from the computing unit. For that purpose, the liaison circuit logic 7 replaces the memory address defined by the position of the scanner 2 by the address of the memory area which it is desired to monitor and which is entered in the main register 19. When the operation demanded by the computing unit is completed, the scanner 2 recommences the cycle at the address at which it was interrupted.

Different impulses delivered by the clock permit the following treatments:

Advance of the scanner 2 and modification of the memory address;

appearance of the addressed memory line at the output of the memory unit 1;

entry of the new memory line in the main register 9;

registration of the new line in the memory.

The main register is a register of any known type, for example it may be constituted by electronic binary trigger devices.

Its capacity is equal to that of memory area which may be reduced by the capacity of the directory number register if this number is not read during the normal scanning cycle of the memory.

The function of the main register has been described with respect to the functions of the internal logic unit 5 and of the liaison circuit logic 7.

It is coupled directly and in both directions to the memory unit 1, to the liaison circuit register 8, and to the internal logic unit 5, and it is read by the comparison circuit 12 and the supervision adapting circuit 13.

Two time-delay registers on each memory area are furthermore assigned to the taking into account of changes occuring on the line equipment.

The function of internal logic 5 is up-dating each subscriber's position according to the information collected by line equipment monitoring device 3. To that end, internal logic 5 causes time-delays, so as to take no account of transient changes in the line equipment. Internal logic 5 also chooses whether the messages must be sent to central unit 6 or to maintenance-and-supervision table 10, and sees to it that the orders from central computing unit 6 are duly carried out.

This internal logic unit 5 has the function of defining the subscriber's position, preparing the messages to be sent to the computing unit and effecting the monitoring of the different circuits of the system.

It is coupled to the line equipment monitoring device 3, to the main register 9, to the liaison circuit logic 7, to the maintenance calling circuit 11 and to the comparison circuit 12.

It comprises an assembly of coding devices, a monitoring device and two circuits relating to special positions.

The coding devices receive the information concerning on the one hand the previous position of the subscriber's set observed coming from the main register 9, and on the other hand the new state of the two line-equipment relays of this same subscriber's set, coming from the monitoring device 3. These coding devices define the new position of the subscriber which is entered in the register 9. The various subscriber's positions used in the example according to the invention are "rest, presumption of awaiting connection, waiting for connection, marking failure of a line equipment relay, presumption of connection, connection, disconnection, faulty tapping, calling error monitor, calling error, presumption of freedom from calling error". Depending on the subscriber's position, it codes a message which it enters in the liaison circuit register 8 through the intermediary of the liaison circuit logic 7, with the information relating to the subscriber's set concerned and necessary for the treatment of the message.

The various messages prepared will be explained with regard to the description of the liaison circuit register 8.

It comprises a calling wire of the liaison circuit logic 7 permitting it to come into relation with the computing unit.

It also comprises a monitoring circuit prepared by means of a logic circuit coupled at the output with the maintenance calling circuit 11. It receives the parity control bit of the information entered in the register 9, those which are entered in the liason circuit register 8 which pass through the liaison circuit logic 7.

In case of fault detected after observation of these various information, the logic monitoring circuit calls the maintenance through the intermediary of the maintenance calling circuit.

It also comprises two logic circuits which detect two particular subscriber positions corresponding to transient situations. These are the cases of subscriber's set at rest, in which the reserved bit is however marked, and the case of the subscriber's set whose line equipment has its relays at rest, but which is not however in the rest position. Upon detection of these positions, the internal logic 5 starts-up a time-lag which is entered in the portion of the memory area of the subscriber'a set appropriate to this information.

If the time-lag reaches its end without the situation being changed, the subscriber's position is modified to be adherent by the internal logic unit 5.

If the situation has changed during the time-delay, this latter is set back to zero and the internal logic continues its treatment.

The connection J of the internal logic unit and of the comparison circuit is provided in order that the internal logic unit indicates to the liaison circuit 7 that the scanner 2 is positioned on the subscriber's set area sought for by the computing unit. This utilization is explained in more detail in connection with the description of the liaison circuit logic 7.

Liaison circuit logic 7 deals with exchanges between subscriber's monitoring peripheral equipment and central computing unit; in other words, it determines the chronological sequence of the exchanges between liaison circuit register 8 and central computing unit 6.

The special-date, degree-of-occupancy and position registers are updated by the central computing unit 6 in the course of the various stages involved in establishing a connection. The subscriber monitoring peripheral equipment is therefore independent of the anticipated scale of operation of the installation.

An example will now explain how the subscriber's monitoring peripheral equipment operates. It will be assumed that, while the subscriber's position is the free- or rest-position, the monitoring peripheral equipment of line 3 detects the lifting of a receiver. The internal logic unit 5 activates one of the two time-delays assigned to the subscriber's set.

At the end of this time-delay, the internal logic unit notifies the liaison circuit logic 7. If the latter is free, the following information if transferred into the liaison circuit register 8:

the subscriber's line equipment geographical location, given by the position of the memory scanner. s area The category, degree of occupancy, special data, and position given by the memory area.

The internal logic complements this information by recording in the liaison circuit register 8 a message that will enable the central computing unit to determine which type of treatment must be carried out. In the example the message is 'receiver lifting'.

At the moment the liaison circuit is being called and prior to scanning the next subscriber's are of memory unit 1, internal logic unit 5 records the binary element Reserved in work-register 9, to indicate that that particular subscriber's set is being processed. This Reserved information interdicts any modification by the internal logic unit. If the central computing unit is duplicated, then it will likewise interdict any intervention from the second computing unit should the first one have answered the call from the liaison circuit.

When the liaison circuit register 8 is loaded, its associated logic unit calls the two computing units (the exchange's central unit has two), and a circuit enables priority to be given to one or the other. This being so, the content of the liaison circuit register is transferred to the directed computer.

The liaison circuit logic 7 and the associated register 8 ensure the exchanges of the exchanges between the subscriber's monitoring peripheral equipment and the computing unit and more particularly between the internal logic unit 5 and the main register 9 on the one hand and the computing unit 6 on the other, through the intermediary of a register known as the liaison circuit register 8. The logic 7 is a coupled in both directions to the internal logic unit, to the liaison circuit register 8 and to the computing unit.

It comprises a sequence device, an assembly of logic circuits directing the information to be transmitted to or received from the computing unit, wires for transferring order signals, known as order wires, the whole being made up in wired logic.

In the liaison circuit register 8 is inscribed the message intended for or received from the computing unit, as explained in more detail below. It is connected to the liaison circuit logic 7, to the main register, to the scanner 2, to the comparison circuit and to the computing unit.

The various positions of the sequence device correspond to successive phases of treatment between the peripheral equipment and the computing unit, for example "rest, reception of a message from the computer, transmission of a message to the computing unit, change of advance, reply to computing unit, addressing, liberation".

The order wires are the wires which enable the computing unit and the peripheral equipment to identify themselves and to start the dialogue.

In the case where the liaison circuit 7 calls a computing unit, the order wires which will be validated are, again the example according to the invention:

The calling wires of each computing unit and the wire indicating to the computing unit that the liaison circuit 7 is sending information to it, for the direction "liaison circuit to computing unit" and the response and reception wires for the direction "computing unit to liaison circuit" logic 7.

In addition, a parity check wire is provided.

For the case in which two computing units exists, and if they are free and capable of responding to a call from the liaison circuit 7, a trigger device enables priority to be given to one of the two.

In the case where it is the computing unit which calls the liaison circuit, the information exchanged is similar and the same wires are employed.

The operation of the liaison circuit thus depends on the state of the order wires and the message entered in the liaison circuit register, which cause the positions of the sequency device to evolve.

After the rest position, it is positioned at the start on reception or on transmission, depending on the state of the order wires. At each following position, the message entered in the liaison circuit register defines the sequence of the treatment and the new position of the sequence device.

The message entered in the liaison circuit register comprises for example the text of the message, the number of the equipment of the directory number, depending on the case, the category, one parity check bit.

The text of the message may be for example:

When the peripheral equipment calls the computing unit: break-off, calling error, parity fault;

when the computing calls: reading with directory number, reading with equipment number, demand for directory number and the corresponding replies from the peripheral equipment to the computing unit: subscriber's set connected, subscriber's set at rest, dispatch of dispatch of directory number, out-of-order.

Reading with the directory number necessitates the intervention of the comparison circuit.

It is indeed necessary to compare the directory number supplied by the computing unit with all the directory numbers of the memory. The normal cycle of the scanner 2 begins again where it was interrupted as soon as identity has been established.

In order to effect this comparison, the position of the sequence device "change of advance" enables the advance of the scanner to be modified since the directory number is not read during the normal cyclic scanning.

It can only be effected on this position of the sequence device.

Central computing unit 6 performs the processing corresponding to the message transmitted and calls back the liaison circuit 7 in order to change the subscriber's position to "awaiting the connection". The connection is thereafter detected by the line equipment monitoring device 3 and the internal logic unit changes the position to "connected".

Figure 3:
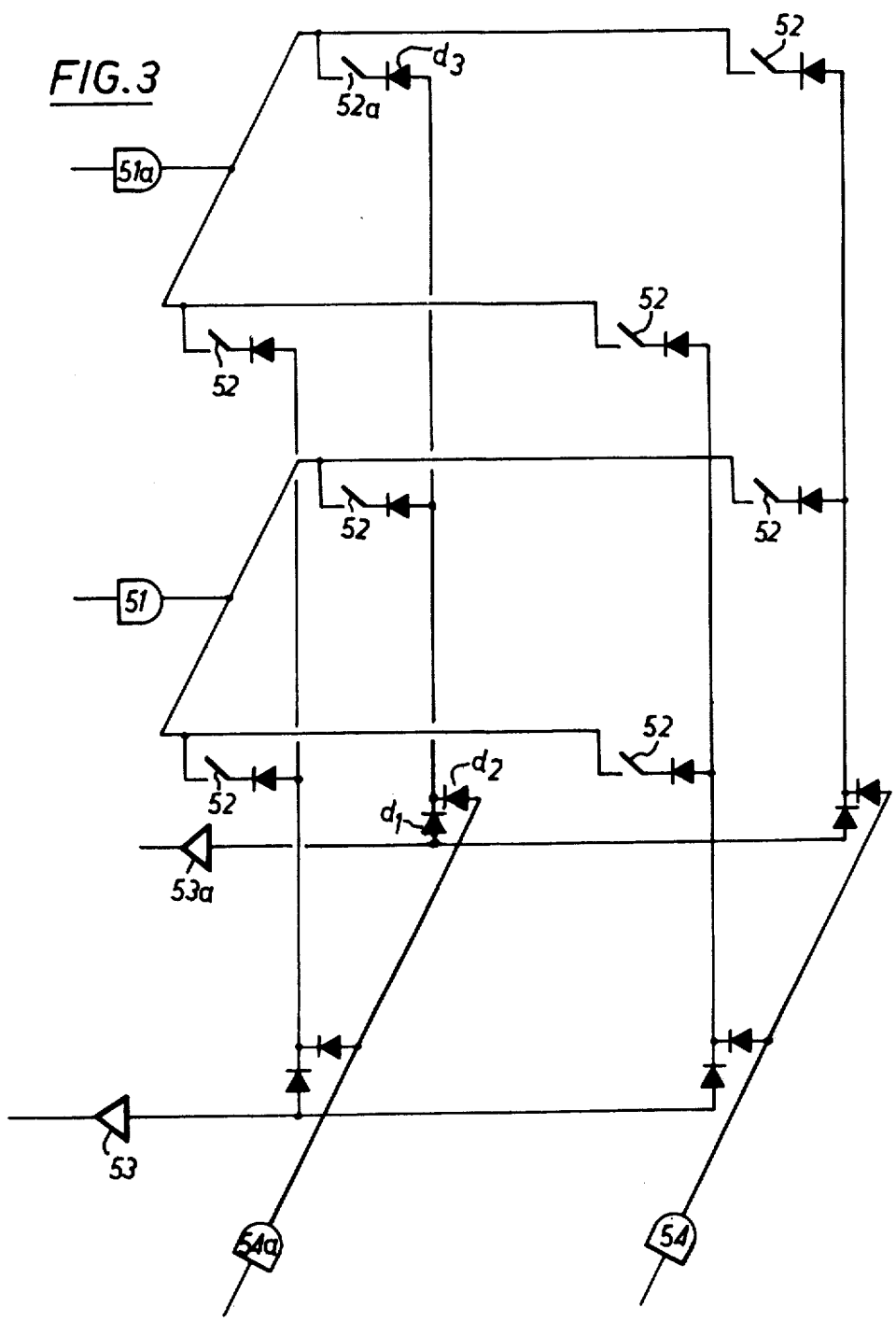
FIG. 3 shows the line equipment monitoring device.

The monitoring device 3, as shown in FIG. 3, preferably consists of a 'cubic test' system.

All the contacts to be monitored located in the subscriber's line equipment are included in a circuit which can be represented diagrammatically as an assembly of planes. Each contact 52 is located at the intersection of three planes: a plane, such as represented horizontally in FIG. 3, operated by a control circuit 51, the control circuits 54 and the detectors 53 are shown parallel to each other respectively. For example, the contact 52a is located at the intersection of the planes defined by the control circuits 51a and 54a and by the detector 53a.

Each detector 53 applies on the plane which it defines a positive voltage, for example + 10 V in one example of embodiment of the invention. These are circuits capable of detecting that they are traversed by a current and notifying the internal logic unit 5 of this fact.

In order to monitor a contact 52a, the internal logic unit 5 addresses the planes defined by the control circuits 51a and 54a, the detectors 53 then indicating the state of all the contacts 52 located at the intersection of the addressed planes. In particular, the detector 53a indicates the state of the contact 52a. When a plane is not addressed, the corresponding control circuit transmits to this plane a positive voltage higher than the voltage transmitted by the detectors 53, for example + 12 V in the example described.

If one or the other of the control circuits 51a or 54a transmits a voltage of + 12 V, the diodes $d1$ and $d3$ or the diode $d1$ are respectively blocked and no current passes through the detector 53. On the other hand, when the planes corresponding to the control circuit 51a or 54a are addressed, these circuits transmit a voltage OV. The diode $d2$ is then blocked and a current circulates from the detector 53a to the control circuit 51a provided that the contact 52a is closed. There is thus detection of current in the detector 53a if the contact 52a is closed, and no current if the contact 52a is open, which permits the state of the contact 52a to be known.

When the receiver is replaced, no intervention by the central unit takes place. This phase is controlled by the peripheral equipment alone which, in conjunction with a printer on a supervision and maintenance table 10, and via maintenance calling circuit 11, further processes all anomalies detectable on the line equipments.

The maintenance calling circuit 11 essentially comprises a register and a maintenance calling circuit. When an anomaly has been detected, the internal logic records the indication of such anomaly in the register of maintenance calling circuit 11. This circuit then calls the maintenance table 10 and transmit the indication of the anomaly to the latter.

In order to be able to achieve this call, this circuit 11 comprises a register and a wired logic portion, and is connected to both the internal logic unit 5 and to the table 10.

In the register of circuit 11 there is entered the information relating to a fault detected by the internal logic unit 5 : number of equipment concerned or circuit concerned, type of fault. When the collected information is complete, the contents of the register are transmitted to the maintenance 10 which is provided for treating the fault.

Parallel with this call, the internal logic marks the bit reserved in the faulty area or areas as to prevent any intervention of the computing unit.

If the fault is serious, passage over an emergency peripheral may be effected manually by the "emergency" knob mounted on the table 10.

This information, like others which are transmitted by the table for the internal logic unit 5 pass by the maintenance calling circuit 11. This information will be explained with reference to the description of the table 10.

The supervision adapting circuit 13 is so called because it creates the interface between the memory unit 1, and more particularly the main register 9 and the supervision table 10.

It comprises a register of any known type and logic circuits associated with a comparator and with the table 10 with which it works in both directions.

The register receives the information contained in the main register of a peripheral equipment.

This information is then shown visually in the table 10 in the form of lamps.

Precise examples of use will be given in connection with the description of the table 10.

The supervision and maintenance table 10 is composed of an assembly of buttons and lamps. The table 10 may be common to several subscriber's peripheral equipment. In this case, a set of buttons and lamps is allocated to each subscriber's peripheral equipment and in addition, there is a zone common to several peripheral equipments.

The supervision table 10 permits the visual indication of the memory area reserved for a subscriber's set on the demand of the operator at the table 10.

For that purpose, a button is provided enabling the operator to allocate the common zone to a definite peripheral equipment.

Depending on whether the operator wished to select the subscriber's set by his directory number or his equipment number, he must press one of the two corresponding buttons "directory number" or "equipment number" and then he can select the subscriber's set by depressing the keys defining a directory number (thousand, hundreds, tens, units) or a equipment number (shelf, bay, board, equipment number).

In the case of a selection by equipment number, this latter is compared in the adapting circuit 13 with the position of the scanner defining the equipment number monitored (connection I).

When equality is obtained, the adapting circuit 13 validates the entry of the information contained in the main register 9 into the register of the supervision circuit 13.

In the case of selection by directory number, the addressing of the memory provides for the reading of the directory numbers. The comparison is effected between the directory numbers appearing successively in the main register 9 and the number selected by the operator. When the numbers are identical, the memory area of the subscriber's set is transferred from the main register 9 to the register of the adapting circuit 13 so as to be shown visually.

This utilization is completed as follows: when the operator has selected a subscriber's set he can follow on his table 10 the evolution of the internal logic for this subscriber's set by blocking the scanner 2.

In order that the operator may correctly observe the evolution, he can effect the step-by-step progress of the evolution by depressing the corresponding key on the table 10 (this type of operation should preferably be carried out when there is no traffic).

Another operation is permitted from the table 10. It corresponds to the button "introduction of data" and to a set of zero re-setting buttons. The information transmitted through the intermediary of those buttons passes through the adapting circuit 13 like the step-by-step progress control. This operation and others will not be described in any more detail since they do not form an integral part of the invention. This is also the case for everything which permits maintenance properly so-called associated with the table.

The preceding operations of supervision of a subscriber's set have only been described here for the purpose of defining the function and of explaining the inter-connection in the peripheral equipment of the supervision adapting circuit 13 and of the maintenance calling circuit 11.

Figure 2:
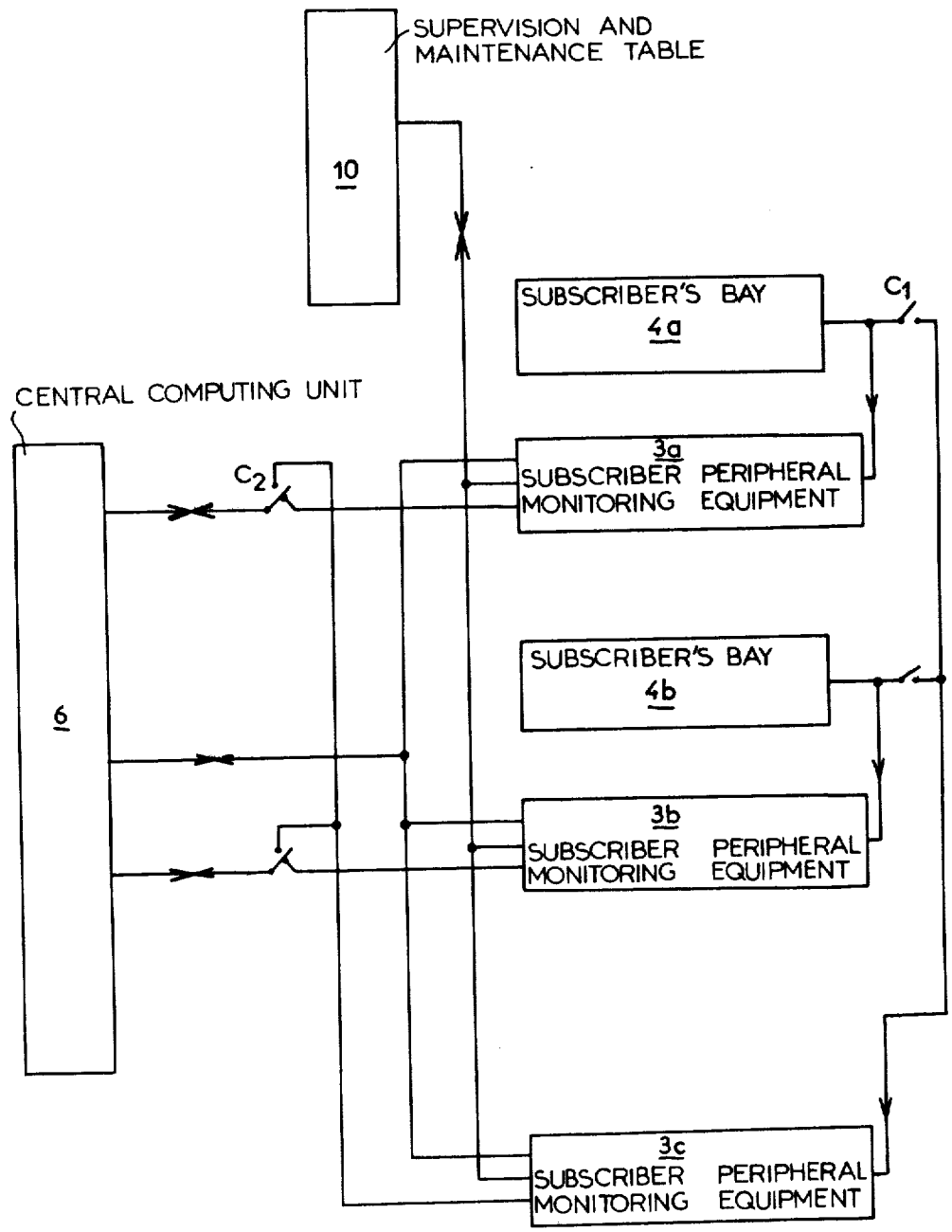
FIG. 2 is a block diagram in which a plurality of peripheral equipments are parallel-connected to a common central computing unit.

Referring next to FIG. 2, several peripheral equipments 3a, 3b (associated with subscriber's bays 4a, 4b) and 3c can be parrallel-connected to a central computing unit 6 in order to increase the possibilites of an exchange. One of these circuits (3c) can be set aside as an emergency unit to replace either of the other operative peripheral equipment if it should fail.

Transition to the emergency peripheral circuit is effected as follows :

Energize emergency peripheral equipment 3c.

Actuation, by an operator, of a push-button located on the supervision-and-maintenance table 10, the function of which will be explained hereunder.

Introduction of the permanent data, viz. the directory number, the category and the line equipment number of each of the subscriber's sets previously monitored by the faulty peripheral equipment.

The maintenance-and-supervision table comprises such operator-actuated bottons in equal number to the monitoring peripheral equipments contained in the telephone exchange. Each of these buttons corresponds to a given peripheral equipment. Whenever the operator actuates one of these buttons (e.g. the one corresponding to peripheral equipmemt 3a in FIG. 2), the corresponding contacts $C_1$ and $C_2$ are actuated.

Closing contact $C_1$ causes subscriber's bay 4a to be connected to emergency peripheral equipment 3c. The tilting of contact $C_2$ deletes the connection between the central computing unit and peripheral equipment 3a, and exchanges them for connections between the central computing unit and emergency peripheral equipment 3c.

The procedure for reverting to the previously failed peripheral equipment is as follows:

Energize the previously failed peripheral equipment, shut off the emergency peripheral equipment by acutating the above-mentioned button in the opposite direction.

Each of the different circuits mentioned hereinbefore is well-known per se and accordingly calls for no detailed description.

I claim:

1. A peripheral equipment for monitoring relays in the line equipments of subscriber's telephone sets of a subscriber's bay in an electronic telephone exchange having at least one such peripheral equipment and at least one central computing unit and a supervision and maintenance table to which said peripheral equipment is connected, comprising a subscriber line equipment monitoring means connected to the subscriber's bay to sense the positions of the relays in the line equipment of subscriber's sets and detect the lifting of a receiver on a subscriber's set;

a memory means connected to a main register and including one area per subscriber's set and connected to said central computing unit;

an internal logic unit to activate said register connected to said memory means upon receiving information from said monitoring means connected to said monitoring means;

a scanner for analyzing said memory means connected to said memory means and to said monitoring means;

a liaison circuit logic means associated to a liaison circuit register, to receive information from said internal logic unit connected to the central computing unit for processing of said information and connected for receipt of signals from the central computing unit and connected for detection of said signals by said internal logic unit and said monitoring means;

a maintenance calling circuit connected between the supervision and maintenance table and said internal logic unit;

and a supervision adapting circuit to validate information of said register sent to said supervision and maintenance table connected between the supervision and maintenance table and between said main register and said scanner.

2. A peripheral equipment as claimed in claim 1, further characterized by each area in said memory means including a position register, a degree of occupancy register and a special-data register and each of said area per subscriber's set connected to said main register.

3. A peripheral equipment as claimed in claim 1 further characterized by two time-delay registers in each of said area of subscriber's sets of said memory means to operate on said areas upon changes of the line equipment of a subscriber's set.

4. A peripheral equipment as claimed in claim 1, further characterized by comparison means connected between said main register and said liaison circuit register to compare the called subscriber's number with subscriber numbers stored in said areas of said memory means.

* * * * *